United States Patent [19]
Stratton

[11] 3,844,348
[45] Oct. 29, 1974

[54] METHOD OF CONTROLLING SUBTERRANEAN FORMATION PERMEABILITY EMPLOYING GRAFT-POLYMERIZED BACTERIAL GUM POLYSACCHARIDE COMPOSITIONS

[75] Inventor: Charles A. Stratton, Dewey, Okla.

[73] Assignee: Phillips Petroleum Company, Bartlesville, Okla.

[22] Filed: Dec. 14, 1972

[21] Appl. No.: 314,959

[52] U.S. Cl.............. 166/246, 166/270, 166/274, 166/294
[51] Int. Cl............. E21b 33/138, E21b 43/22
[58] Field of Search .......... 166/294, 295, 246, 270, 166/274, 305 R; 252/8.55 D, 8.55 R, 8.5 A, 8.5 C; 260/17.4 G, 17.4 C, 17 A, 29.6 M

[56] References Cited
UNITED STATES PATENTS

| | | | |
|---|---|---|---|
| 3,138,564 | 6/1964 | Borunsky | 260/17 A |
| 3,208,518 | 9/1965 | Patton | 166/246 |
| 3,305,016 | 2/1967 | Lindblom et al. | 166/246 |
| 3,306,870 | 2/1967 | Eilers et al. | 260/29.6 M |
| 3,332,897 | 7/1967 | Ray-Chaudhuri | 260/17.4 GC |
| 3,532,166 | 10/1970 | Williams | 166/275 X |
| 3,543,855 | 12/1970 | Blatz et al. | 166/275 X |
| 3,708,446 | 1/1973 | Pettitt | 260/17.4 GC |
| 3,746,094 | 7/1973 | Norton et al. | 166/275 |

*Primary Examiner*—Stephen J. Novosad

[57] ABSTRACT

A method is described which comprises the step of contacting a subterranean formation with an aqueous composition containing at least one bacterial gum polysaccharide wherein the gum polysaccharide is chemically modified by the presence of at least one suitable polymer graft. In a preferred embodiment the polymer graft is derived from the free radical polymerization of a monoolefin containing up to five carbon atoms and having at least one substituent selected from the class consisting of cyano, substituted or unsubstituted carbamyl, carboxy or carbalkoxy groups.

10 Claims, No Drawings

METHOD OF CONTROLLING SUBTERRANEAN FORMATION PERMEABILITY EMPLOYING GRAFT-POLYMERIZED BACTERIAL GUM POLYSACCHARIDE COMPOSITIONS

This invention relates to a method for controlling the porosity of subterranean formations, a method of preparing a bacterial gum polysaccharide having a polymer grafted thereon, and to a bacterial gum polysaccharide having a polymer grafted thereon.

Attendant to the production of oil and/or gas from subterranean hydrocarbon-containing formations is the concurrent production of undesirable quantities of either water and/or gas. The source of the water or gas can be a naturally occurring reservoir fluid, such as from a drive aquifer or gas cap, or an artificial drive fluid, such as injection water from secondary recovery treatments applied to reservoirs, gas drive projects, gas repressurization, miscible displacement projects and the like. Regardless of the source, the problem associated with the recovery of oil and/or gas from said formations is primarily occasioned by the predilection of a natural or artificial drive fluid, i.e., either water or gas, to preferentially seek the higher permeability zones of the reservoir and to more or less bypass the lower permeability zones of the producing formation.

In an attempt to modify the mobility of natural or artificial drive fluids present within any geological formation, the prior art has added various polymeric materals to said subterranean geological formations in an attempt to decrease the relative mobility of water and/or gas through various zones of said subterranean geological formation. In general, the polymeric materials comprise water-dispersible polymers selected from the group consisting of polyacrylamides and related polymers which are known to increase the viscosity of aqueous solutions containing said polymeric materials. The employment of said polyacrylamides in partially hydrolyzed form plus other polymers has been found to be suited to modification of the relative mobility of water and/or gas in subterranean geological formations. To date, the prior art has not found a convenient, practical or effective means for treating said geological formations whereby the relative mobility of the fluids contained therein remain substantially unchanged therein regardless of the salt or saline content of the natural or artificial drive fluids contained within the reservoir.

It is an object of this invention to provide a method for at least reducing the relative mobility of undesirable fluids which are associated with recovery of hydrocarbon fluids from subterranean geological formations containing said hydrocarbon fluids. Another object is to provide a method for at least reducing the gas:oil ratio in permeable geological formations containing recoverable hydrocarbon fluids. Another object is to provide a method for at least reducing the water:oil ratio in a porous geological formation containing recoverable hydrocarbon fluids. Still another object is to reduce the relative mobility of undesirable water and/or gas which is produced in association with the desired hydrocarbon fluids contained in said geological formation. Still another object is to provide a method for substantially stabilizing the relative mobility of water contained within the porous hydrocarbon-containing formation independent of the salinity of the water contained within said formation. These and other objects, advantages and aspects will be readily apparent to those skilled in the art from the disclosure and the appended claims.

In accordance with the present invention, there is provided a method for reducing the fluid permeability of a porous hydrocarbon-containing geological formation which comprises broadly the steps of contacting said formation with an aqueous composition comprising at least one graft polymerized bacterial gum polysaccharide wherein said polysaccharide is chemically modified by the presence of at least one polymer grafted onto said bacterial gum polysaccharide. In a preferred embodiment said polymer graft is derived from the free radical polymerization of a monoolefinically unsaturated monomer containing up to five carbon atoms and having at least one substituent selected from the class consisting of cyano, substituted or unsubstituted carbamyl, carboxy or carbalkoxy substitutents.

Another embodiment of this invention provides a method for the recovery of at least a portion of the hydrocarbon content of a porous subterranean formation comprising the injection of a graft polymerized heteropolysaccharide into a selected portion of portions of the formation for a period of time sufficient to introduce said heteropolysaccharide into the formation. Following introduction of grafted heteropolysaccharide by any means into a porous subterranean structure, drive fluids can be introduced into said structure for the purpose of propelling at least a portion of the oil and/or gas contained therein to a recovery zone in accordance with conventional waterflooding processes well known in the art. Broadly, the recovery method comprises introducing an aqueous solution comprising graft polymerized heteropolysaccharide into an oil-containing formation, subsequently introducing into the formation a convenient drive fluid, and thereafter withdrawing from said formation at least a portion of the hydrocarbon contained therein. Another embodiment of this invention permits in situ preparation and treatment of the formation with a graft polymerized heteropolysaccharide. Said in situ method comprises: (1) introduction of an aqueous solution of a bacterial gum heteropolysaccharide essentially free of a reducible multivalent metal component and a graft polymerizable monomer species into said formation; (2) termination of step (1); (3) introduction of at least a polymerizable monomer species suitable for graft polymerization upon said polysaccharide, said monomer species being essentially free of a reducible multivalent metal component; (4) termination of step (3); (5) introduction into said formation of at least one reducible multivalent metal compound; (6) termination of step (5); and thereafter (7) introducing at least one reducing component which in combination with said at least one reducible multivalent metal compound introduces into said formation, in intimate admixture with said polysaccharide and said monomer species, a reducing-oxidizing catalyst system suitable for graft polymerization of said monomer species to said heteropolysaccharide structure; (8) introducing an aqueous composition essentially free of said polysaccharide, said monomer species, said multivalent reducible metal compound or said reducing compound; and (9) withdrawing from said formation at least a portion of the hydrocarbon contained therein.

Any amount of graft polymerized heteropolysaccharide can be employed in the treatment of a porous formation. Generally, useful amounts vary widely and often fall within the range of from about 50 to 5000 ppm of aqueous composition. In a preferred embodiment of this invention the drive fluid is a saline solution. Any salinity range can be employed. A convenient recipe for many applications varies from as much as 1 ppm to as much as $10^{10}$ ppm with the maximum ppm limit only being the maximum solubility of the salt in the aqueous solution at the temperature of injection or treatment of the subterranean formation.

The bacterial gum polysaccharides that are employed in the practice of this invention comprise the heteropolysaccharides produced by the permutation of carbohydrates by bacteria of the genus Xanthomonas. Exemplary of such heteropolysaccharides are those produced by *Xanthomonas campestris, Xanthomonas begonia, Xanthomonas phaseoli, Xanthomonas hederae, Xanthomonas incanae, Xanthomonas carotae,* and *Xanthomonas translucene.* Of these, ionic polysaccharide B-1459 is preferred. The polysaccharide B-1459 is prepared by culturing the bacterium Xanthomonas campestris NRRL B-1459, United States Department of Agriculture, on a well-aerated medium containing commercial glucose, organic nitrogen sources, dipotassium hydrogen phosphate, and various trace elements. Fermentation is carried out to completion in 4 days or less at a pH of about 7 and a temperature of 28° C. Polysaccharide B-1459 is commercially available under the trade name of "Kelzan" from the Kelco Company, San Diego, California. The high molecular weight polysaccharides produced in accordance with the above procedure are well known in the art and are further described in U.S. Pat. No. 3,000,790. The molecular weight of heteropolysaccharide Kelzan MF is estimated by the manufacturer as being at least over 1,000,000 and probably on the order of 8,000,000 to 10,000,000. Regardless of the molecular weight, providing the heteropolysaccharide is at least water-dispersible, polymeric entities can be grafted onto the hteropolysaccharide under any convenient graft polymerization conditions. The grafting of polymeric entities to the heteropolysaccharide, preferentially by free radical polymerization of at least one monoolefinically unsaturated monomer species containing up to 5 carbon atoms having at least one substituent selected from the class consisting of cyano, hydrocarbyl-substituted or unsubstituted carbamyl, carboxy or carbalkoxy groups, can be carried out under any well-known free radical polymerization initiation conditions such as those employing irradiation, peroxy compounds, i.e., hydrogen peroxide, persulfates, hydroperoxides, azo compounds, as well as conventional heavy metal redox systems.

Representative of monomeric reactants satisfying the requirements of the preferred monoolefinic unsaturated monomer species are such compositions as: acrylamide, a presently preferred monoolefinic reactant; acrylonitrile; methylacrylonitrile; acrylic acid; methacrylic acid; acrylic and methacrylic acid esters of methyl and ethyl alcohol; N-methylacrylamide; N,N-methylacrylamide; and N-ethylacrylamide.

Any amount of polymeric material grafted onto the heteropolysaccharide improves the reduction and subsequent maintenance of fluid permeability of porous subterranean formations treated with said materials. Accordingly, in general, the total weight percent of graft polymer based on the weight of the heteropolysaccharide employed in the practice of this invention is any measurable amount, preferably at least about one percent, more preferably at least about two percent, and even more preferably at least about three percent by weight based on the weight of the heteropolysaccharide. Optimum efficiencies of polysaccharides chemically modified by having grafted thereon a polymeric species such as polyacrylamide occurs wherein the polymeric species is present within a range of from about 5 to about 10 percent by weight of the heteropolysaccharide structure. Increased amounts of polymer species grafted onto heteropolysaccharide structures have been found to have little or no additional effect upon the efficiency of heteropolysaccharides at least with respect to the retention of optimum relative retained mobility (RRM) values wherein the control heteropolysaccharide contains from about 5 to about 10 percent by weight of graft polymer. In general, any monoolefinic material grafted in accordance with the previously discussed percentages by weight with respect to heteropolysaccharides exhibits the same degree of improvement in efficiency as that specifically pointed out with respect to a graft of polyacrylamide treatment to a heteropolysaccharide. The optimum values associated with any particular polymer graft can readily be determined by those skilled in the art through simple experimentation in accordance with teachings of this disclosure.

Any method of initiating graft polymerization by free radical systems well known in the art can be employed in the preparation of the chemically modified heteropolysaccharides. One suitable means comprises contacting a bacterial gum heteropolysaccharide dispersed or dissolved in an aqueous solution, subsequently contacting said aqueous solution or dispersion with at least one redox catalyst system, i.e., a system comprising a suitable reducing component and an oxidizing component comprising a reducible polyvalent heavy metal. It is generally desirable that the oxidizing component of the redox system be at its highest level of oxidation, e.g., if the oxidizing component is a cerium compound, the cerium preferably should be at its +4 valence state. Other suitable oxidizing components comprise other polyvalent metals including ferric iron$^{+3}$, titanium$^{+4}$, tin$^{+4}$, wherein the superscript numbers represent the metal valence. In addition to being in its highest valence state, the oxidizing component polyvalent metal preferably is in a form which is readily available to effect crosslinking of the polymer as well as initiate the graft polymerization of monomeric materials to the backbone of the heteropolysaccharide structure. A presently preferred graft polymerization process within the scope of this invention comprises the employment of a ceric ion redox system such as that described for the preparation of graft copolymers of polyacrylamide upon polymeric backbones of cellulose and other polyglucosides such as dextrins and starches and polygalactosides, such as carrageenans, as described in General Polymer Science, Vol. 31, No. 122 (1958), pp. 242–243. The amount of oxidizing component employed is any sensible amount sufficient and effective to cause graft polymerization of the substituted monoolefin to a heteropolysaccharide structure. Generally suitable starting quantities of the oxidizing components of a redox catalyst system which are effective in the practice of this invention are redox catalyst systems wherein the oxidizing component is present in sufficient amounts to provide at least $3 \times 10^{-6}$, preferably at least $3 \times 10^{-5}$, gram atoms of a reducible multivalent metal per gram of graft monomer. Preferably, the amount of metal capable of being reduced which is used will not exceed $4 \times 10^{-3}$, more preferably $2 \times 10^{-3}$, gram atoms of said metal per mole of graft monomer.

The amount of reducing component employed in the practice of this invention can also be any sensible amount, i.e., any small but finite amount which is effective and sufficient to reduce at least a portion of the multivalent metal component of the oxidizing component to a lower polyvalent state. Thus, the amount of reducing agent depends upon the amount and type of reducible multivalent metal component employed. As a general rule, an effective amount of reducing agent will generally be within the range of from about 0.1 to about at least 300, preferably at least 200, weight percent of the stoichiometric requirements sufficient to reduce the multivalent metal compound to a lower polyvalent state, e.g., +4 cerium to +3 including sulfur-containing compounds such as sodium sulfide, sodium hydrosulfite, sodium metabisulfite, sodium thiosulfate, ferrous sulfate, thioacetamide, hydrogen sulfide, including hydrogen sulfide naturally present in the formation being treated, and others, and nonsulfur-containing compounds such as hydroquinone, ferrous chloride, para-hydrazinebenzoic acid, hydrazine phosphite, hydrazine dichloride, and others. Presently preferred reducing agents in the practice of this invention are sodium bisulfite, sodium hydrosulfite, potassium hydrosulfite or hydrogen sulfide. The method of preparing the modified bacterial gum heteropolysaccharides and the use thereof in reducing and maintaining the fluid permeability of subterranean formations will be further illustrated by the following examples which are not intended to unduly limit the scope of the appended claims.

EXAMPLE I

In the following example, a glass bead pack test developed to measure the three main components of waterflood mobility control action by polymer additives, e.g., near-face plugging, mobility effects on the bulk of the porous medium during the flow of the polymer solution, and mobility effects retained after brine flush, was employed to evaluate the mechanisms by which waterflood additives can improve sweep efficiency in a porous hydrocarbon-containing subterranean oil reservoir.

Details of the test procedure employed are as follows. Commercial glass beads which provide a relatively constant surface effect compared to the considerable variation expected in reservoir rock were empolyed as a reference unconsolidated flow cell media. Glass beads provided packs with brine permeabilities ranging from 500 to 5000 md. Crosslinked graft polymerized heteropolysaccharide polymers were evaluated for RM and RRM by means of an apparatus designed for study and comparison of the heteropolysaccharide with various commercial polymer solutions at constant injection pressures. The glass flow cells were packed with glass beads, weighed before and after packing, and the porosity calculated on the basis of the weight and gram density of the glass beads. Brine and polymer solutions employed in the tests were passed through the glass bead pack flow cells according to the following sequence:

Flow cell was slowly saturated with synthetic brine under steady state conditions at constant injection pressures of 150 cm $H_2O$ and the permeability of the pack to brine was calculated from the measurement of the flow rate and pressure drop within the system.

Subsequently at least 2 pore volumes of polymer solutions were injected into flow cell displacing the brine which was followed by at least 2 pore volumes of a brine flush.

The decrease in water mobility caused by the polymer additive expressed as the mobility of the polymer solution relative to that of the brine solution in the original pack, i.e., RM, and the mobility decrease retained during the subsequent brine flush expressed as the residual relative mobility, i.e., RRM, were calculated from the data obtained during the polymer injection and brine flush sequence referred to hereinbefore.

Aqueous solutions were prepared containing approximately 250 ppm of crosslinked graft polymerized bacterial gum polysaccharide hereinafter referred to as "A" (prepared in accordance with the procedure set out in Example II hereafter), a bacterial gum polysaccharide free of crosslinking and/or graft polymer hereinafter referred to as "B," and Dow Pusher 700, a proprietary product of Dow Chemical Company having a nitrogen content of about 12.3 percent and a reported approximate molecular weight of 5,500,000, hereinafter referred to as "C," Dow Pusher 1000 having a nitrogen content of about 11.9 percent and a reported approximate molecular weight of 10,000,000, hereinafter referred to as "D," and Betz High Vis copolymer of acrylamide proprietary product of Betts Betz Laboratories, Inc., Trevose, Pa. in which about 27–32 percent of the total of carboxyl and carboxamide groups are carboxyl groups, a nitrogen content of about 8 percent and a reported approximate molecular weight of 15,000,000–16,000,000, hereinafter referred to as "E." The brine solutions employed comprised aqueous solutions containing 1200 ppm and 51,000 ppm of sodium chloride salt into water and are referred to hereinafter as brine "X" and brine "Y," respectively. Table I follows.

TABLE I

| Run No. | Polymer/Brine | RRM |
|---------|---------------|------|
| 1 | A/X | 0.30 |
| 2 | A/Y | 0.30 |
| 3 | B/X | 0.69 |
| 4 | B/Y | 0.76 |
| 5 | C/X | 0.25 |
| 6 | C/Y | 0.43 |
| 7 | D/X | 0.17 |
| 8 | D/Y | 0.57 |
| 9 | E/X | 0.05 |
| 10 | E/Y | 0.36 |

The results of Run Nos. 1 and 2 illustrate that the residual relative mobility (RRM) values for the glass bead cell packs were improved by a decrease and/or maintenance of RRM values to a level of 0.30 when contrasted to control Run Nos. 3 and 4 defining the RRM values associated with chemically unmodified bacterial gum polysaccharides ranging from 0.69 to 0.76 although the brine concentration varied widely in saline content. The effectiveness of all other polymer additives Run Nos. 5–10 illustrate that RRM values deteriorate significantly as the salinity of the brine solution increases, and at high salinity the crosslinked graft polymerized polysaccharides are equal to or better than present-day commercially employed polymer additives.

EXAMPLE II

The procedure employed in the preparation of crosslinked graft polymer bacterial gum polysaccharides of Example I was as follows: Heteropolysaccharide "B" 1459 prepared by the fermentation of carbohydrates by bacteria of the genus Xanthomonas Campestris was chemically modified in accordance with the following procedure.

A 500 ml portion of boiled distilled water was prepared;

A 3–10 g. portion of acrylamide was added to the distilled water portion;

Five grams (dry weight) of heteropolysaccharide B-1459 was added to the water. A nitrogen blanket was maintained over the surface of the water while the water saccharide mixture was subjected to agitation to dissolve the polysaccharide therein;

Thereafter a portion 5 to 15 ml of a ceric ammonium nitrate, in a 1.0 molar nitric acid was added to the aqueous polysaccharide medium;

After the addition of the ceric initiator, agitation was continued in order to insure homogeneous dispersal of the ceric compound;

Agitation was discontinued, the contents of the reaction media was maintained under a nitrogen blanket for a period of 1–4 hours at a reaction temperature of 77° F. or 120° F. The contents of the reaction media were combined with approximately 1100 ml of acetone and the mixture was agitated in order to separate the fully dehydrated, precipitated, chemically modified "B" 1459 heteropolysaccharide containing a graft polymer of polyacrylamide. The chemically modified polymer was dissolved in water with agitation and then precipitated from acetone;

The chemically modified product recovered from the previous step was dried overnight in a vacuum oven at 50° C. and pulverized prior to preparation of aqueous solutions thereof at the desired concentration.

For testing purposes a 0.250 gram of powdered product was dissolved overnight with continuous agitation in 1 liter of distilled water. Analytical results for cerium and nitrogen were secured for the dry grafted products and nitrogen determinations provided the means of calculating the percent grafted acrylamide in the polysaccharide product.

EXAMPLE III

The polyacrylamide grafted heteropolysaccharides prepared in accordance with the procedure set out in Example II when analyzed for cerium content were found to have cerium ion contents varying within the range of from about 0.6 to 3.3 percent by weight based on the weight of the resulting polyacrylamide grafted heteropolysaccharide. In order to determine the crosslinking effect or the influence of the cerium ion retained in the chemically modified polysaccharide, a control polymer was prepared in accordance with the procedure set out in Example II with the exception that no acrylamide monomer was added to the aqueous bacterial gum polysaccharide solution. For purposes of comparison, the RRM values of heteropolysaccharide chemically modified by the presence and influence of both polyacrylamide graft polymer and cerium ions compared with the RRM values associated with heteropolysaccharide chemically modified by the influence solely of a cerium ion crosslinking agent were determined. Chemically modified heteropolysaccharides modified by the presence of a multivalent cerium ion and polyacrylamide grafts similar to those employed in Example I are referred to hereafter by the letter "A," a heteropolysaccharide treated solely by the addition of a multivalent cerium ion and free of any polyacrylamide polymer graft is hereinafter referred to by the letter "F," and as a control an unmodified heteropolysaccharide free of either a multivalent cerium ion or a polyacrylamide graft is hereinafter referred to in a similar manner with that of Example I by the letter "B." Brine concentrations of 1200 ppm and 51,000 ppm are represented hereinafter by the letters "X" and "Y," respectively.

TABLE II

| Run No. | Polymer/Brine | Average RRM Values |
|---|---|---|
| 11 | A/X | 0.30 |
| 12 | F/X | 0.60 |
| 13 | B/X | 0.69 |
| 14 | A/Y | 0.30 |
| 15 | F/Y | 0.58 |
| 16 | B/Y | 0.76 |

The foregoing data illustrates that improved mobility RRM values of 0.60–0.58 are obtained wherein chemical modification of the heteropolysaccharide is limited to the presence of a crosslinking multivalent cerium ion; however, additionally, said data clearly illustrates that unexpectedly superior results are obtained wherein the heteropolysaccharide structure is modified not only by the presence of a cerium ion but particularly wherein said polysaccharide has a polyacrylamide graft.

Reasonable variations and modifications are possible within the scope of this disclosure without departing from the spirit and the scope thereof.

What is claimed is:

1. A method for reducing the fluid permeability of a porous subterranean formation which comprises the step of contacting said formation with an aqueous composition containing at least one water-soluble chemically modified bacterial gum heteropolysaccharide wherein said polysaccharide is modified by the presence of at least one polymer graft wherein said graft is derived from polymerization of at least one monomer species selected from monoolefins containing up to five carbon atoms wherein said monoolefin has at least one carbon atom singly bonded to at least one substituent selected from the group consisting of cyano, hydrocarbyl-substituted carbamyl, unsubstituted carbamyl, carobxy, or carbalkoxy radicals.

2. A method in accordance with claim 1 wherein said formation is a hydrocarbon-containing subterranean formation.

3. A method in accordance with claim 2 comprising the recovery of at least a portion of the hydrocarbon contained in said formation comprising the steps A. introducing into said formation a first aqueous solution consisting essentially of said chemically modified bacterial gum heteropolysaccharide in solution B. terminating step (A);
C. introducing into said formation a second aqueous composition essentially free of said chemically modified heteropolysaccharide; and
D. withdrawing from said formation at least a portion of the hydrocarbon contained therein.

4. A method in accordance with claim 3 wherein said second aqueous composition comprises a saline solution.

5. A method in accordance with claim 4 wherein said at least one monomer species is acrylamide.

6. A method in accordance with claim 1 wherein said graft polymer is derived from polymerization of said monomer species carried out under free radical polymerization conditions.

7. A method in accordance with claim 6 wherein said free radical polymerization conditions comprise contacting an aqueous solution of a bacterial gun heteropolysaccharide with at least one reducible multivalent metal oxidizing component and at least one reducing component of a suitable reducing-oxidizing catalyst system.

8. A method in acocrdance with claim 7 wherein said reducing component is a multivalent metal cation selected from the group consisting of ferric iron$^{+3}$, titanium$^{+4}$, tin$^{+4}$, chromium$^{+3}$, and cerium$^{+4}$.

9. A method in accordance with claim 8 wherein said at least one monomer species is acrylamide.

10. A method in accordance with claim 1 wherein said at least one monomer species is acrylamide.

* * * * *